United States Patent
Sayre

[15] 3,672,717
[45] June 27, 1972

[54] CLAW ARMS WITH SWIVEL PLATE
[72] Inventor: Jack L. Sayre, Glendora, Calif.
[73] Assignee: The United States of America as represented by the Secretary of the Navy
[22] Filed: Jan. 25, 1971
[21] Appl. No.: 109,318

[52] U.S. Cl. ..............................294/104, 294/66 R, 294/88
[51] Int. Cl. ..........................................................B66c 1/44
[58] Field of Search..................294/66, 86, 93, 97, 103, 104, 294/106, 118

[56] References Cited

UNITED STATES PATENTS

| | | | |
|---|---|---|---|
| 3,165,347 | 1/1965 | Keskitalo | 294/88 |
| 3,367,706 | 2/1968 | Gerrans | 294/103 R |
| 3,103,282 | 9/1963 | York | 212/128 |
| 2,706,060 | 4/1955 | Ferrario et al. | 214/652 |

Primary Examiner—Evon C. Blunk
Assistant Examiner—Johnny D. Cherry
Attorney—Richard S. Sciascia and Ervin F. Johnston

[57] ABSTRACT

A claw assembly for retrieving conical objects including a pair of pivoted arms which have inner facing curved surfaces; a swivel plate pivotally mounted to at least one of the arms, said swivel plate having an inner facing curved surface; and the pivot axis of the swivel plate being in a plane which is substantially perpendicular to the pivot axis of the arms. With such an arrangement one arm is capable of engaging a circumference of the conical object and the swivel plate of the other arm is capable of pivoting to engage a tapered portion of the object.

10 Claims, 5 Drawing Figures

PATENTED JUN 27 1972 3,672,717
SHEET 1 OF 2
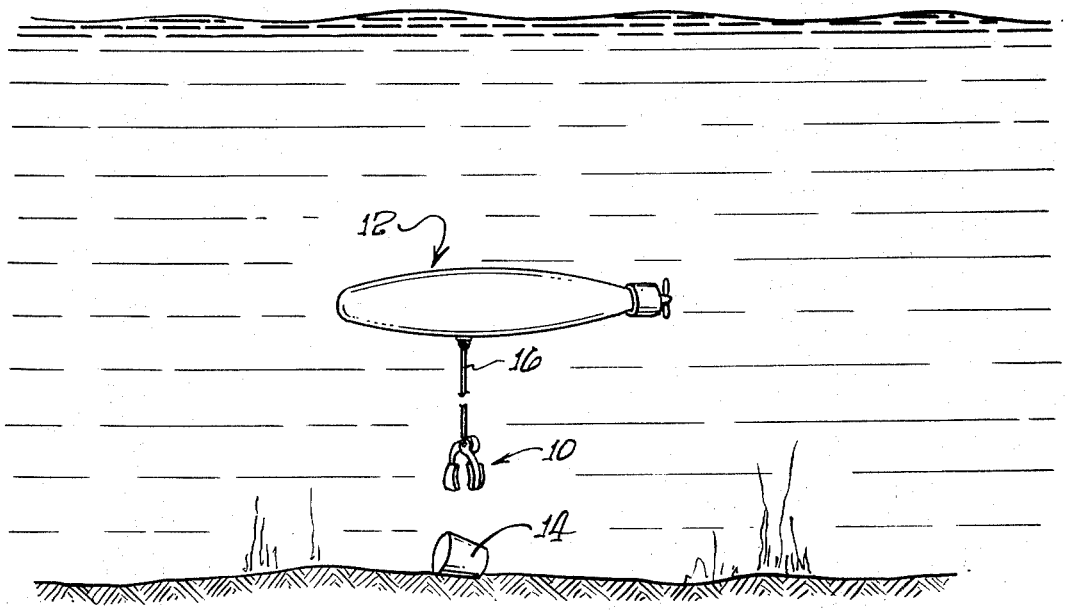
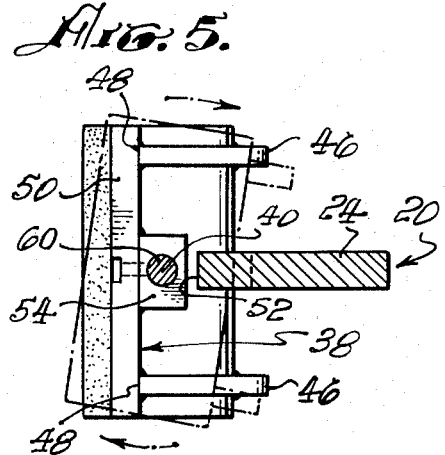
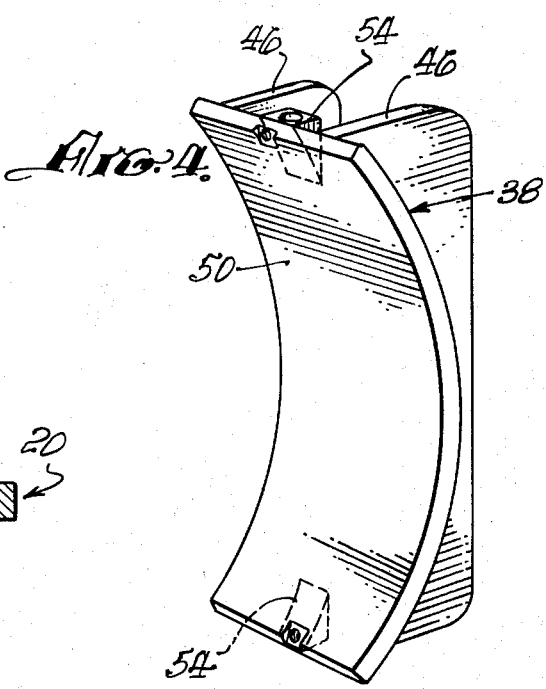
INVENTOR.
JACK L. SAYRE,
By
ERVIN F. JOHNSTON,
ATTORNEY.

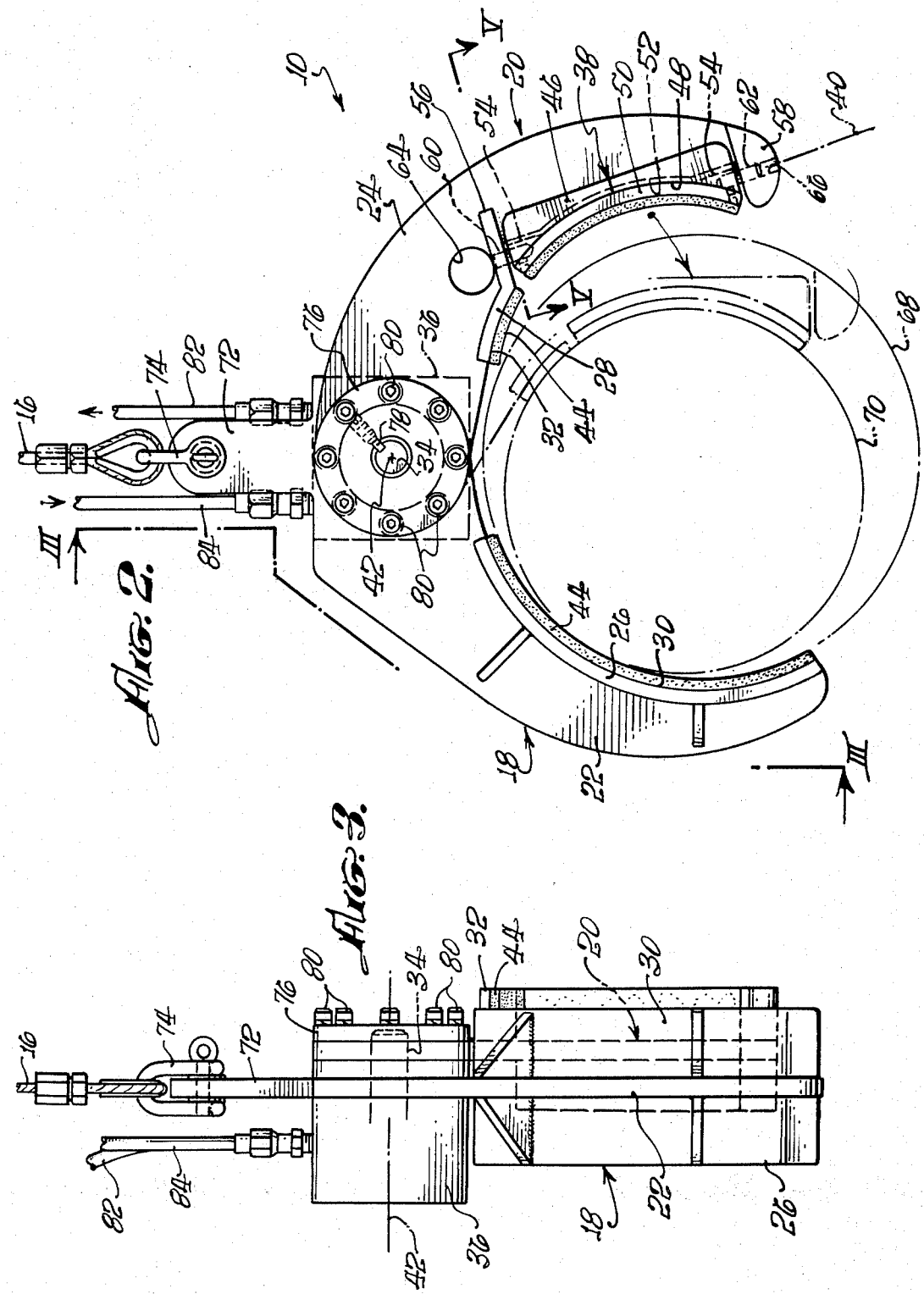

3,672,717

CLAW ARMS WITH SWIVEL PLATE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In ocean depths less than 300 feet it is feasible for a diver to attach lift lines to an object to be retrieved. In greater depths salvage operations are usually carried on with manipulators which may be remotely operated from a surface ship or deep submersible. The most common prior art manipulator is a pair of pivoted arms or claws which can be remotely operated to close on the object which is to be retrieved. A long standing problem with these manipulators has been their inability to retrieve objects of varying sizes and shapes. A shape which is particularly difficult to grab and retain is a conical shaped object. In retrieving such an object, prior art manipulators will normally obtain only point contact along each arm, and in the rare instance where the arcuate inner surfaces of the manipulator's arms match with a particular diameter along the conical object only line contact is obtained by each arm. In either instance the conical shaped object tends to slip away from the initial grabbing force of the arms.

SUMMARY OF THE INVENTION

The present invention is a claw assembly which is capable of retrieving irregular objects, such as a conical object. This is accomplished by providing one of the arms of the claw assembly with a pivotally mounted swivel plate. With such an arrangement the swivel plate of the one arm will pivot to engage a conical object along at least a line transverse the swivel plate and in many instances will make double line contact or surface contact along the tapered portion of the object to be retrieved. Such contact with at least point contact by the other arm will result in reliable retention of the object for retrieval purposes. It has also been discovered that when the swivel plate is provided with a radius which is less than the radius of the inner surface of the other arm even more favorable contact is accomplished and retention of the object is enhanced. While the claw assembly is especially useful for retrieving objects from the ocean bottom it also can be used for retrieving objects on the earth's surface.

STATEMENT OF THE OBJECTS OF THE INVENTION

An object of the present invention is to overcome the aforementioned problems associated with prior art retrieval claw assemblies.

Another object is to provide a retrieval claw assembly which has a reliable capability of retrieving irregular objects, such as a conical object.

Other objects and many of the attendant advantages of this invention will be readily appreciated as it becomes better understood by reference to the description and accompanying drawings which follow.

BRIEF DESCRIPTION OF THE DRAWINGS

FIG. 1 is an ocean view of a deep submersible utilizing the claw assembly for retrieving an irregular object, such as a conical object;

FIG. 2 is a plan view of the claw assembly with a conical object shown in phantom;

FIG. 3 is a side view of the claw assembly taken along plane III—III of FIG. 2;

FIG. 4 is an isometric view of the swivel plate which is pivoted to one of the arms of the claw assembly; and FIG. 5 is a top end view of the swivel plate taken along plane V—V of FIG. 2.

DESCRIPTION OF THE PREFERRED EMBODIMENT

Referring now to the drawings wherein like reference numerals designate like or similar parts throughout the several views there is shown in FIG. 1 a claw assembly 10 which may be remotely operated by a deep submersible 12 for retrieving an irregular object, such as a conical object 14, from the bottom of the ocean. A lift cable 16 may be utilized for suspending the claw assembly 10 from the deep submersible, however, it is to be understood that the claw assembly could alternatively be fixedly connected to the deep submersible at some convenient location for salvage operations.

As illustrated in FIG. 2 the claw assembly 10 may include a pair of pivoted arms 18 and 20. These arms may comprise a pair of curved plates 22 and 24 to which these are mounted curved flanges 26 and 28. The curved flanges 26 and 28 have inner facing curved or arcuate surfaces 30 and 32. The arms 18 and 20 may be pivoted at an output shaft 34 of a hydraulic motor 36 which will be described in more detail hereinafter.

If desired, the arm 18 may function substantially as a static arm while the arm 20 may be pivotally moved with respect to the static arm by fixed attachment to the output shaft 34. In order to provide an improved grabbing force of an irregular object, such as the conical object 14, a swivel plate 38 is pivotally mounted to at least one of the arms 18 or 20, or if desired, a swivel plate could be pivotally mounted to each of the arms. In the preferred embodiment the swivel plate 38 is mounted to the movable arm 20 with the pivot axis 40 of the swivel plate being in a plane which is substantially perpendicular to the pivot axis 42 of the arms. With such an arrangement the static arm 18 is capable of engaging at least a point on the conical object while the swivel plate 38 is capable of pivoting to engage a tapered portion of the object with at least single or double line contact and sometimes surface engagement. This engagement can be enhanced by providing the inner arcuate surfaces of the arms and the swivel plate with rubber pads 44. With such an arrangement the arms and the swivel plate are provided with inner non-skid, grabbing surfaces.

As illustrated in FIG. 2, the swivel plate 38 may be mounted to an outer end portion of the movable arm 28. This arrangement will provide for maximum cooperative grabbing forces between the two arms. As illustrated in FIGS. 4 and 5 the swivel plate 38 may include a pair of elongated plates 46 which have inner facing arcuate edges 48. Along the inner edges 48 there may be mounted a curved flange 50. This entire swivel assembly may be mounted within an inner facing recess 52 (see FIG. 2) within the movable arm 20 so that the curved or arcuate surface of the swivel plate flange 50 is substantially coextensive with the inner surface 32 of the movable plate flange 28. In order to pivotally mount the swivel plate within the recess 52 of the movable arm bosses 54 may be fixedly mounted at the top and bottom outside surfaces of the flange 50 between the longitudinal plates 46. Fixed to the plate 24 at the top and bottom of the recess 52 there may be transverse support members 56 and 58 respectively. As illustrated in FIG. 2 pins 60 and 62 may be journaled within the top members 56 and 54 and the bottom members 54 and 58. A lightening hole 64 may be provided in the plate 24 of the movable arm for insertion of the top pin 60 and the bottom support member 58 may be provided with a bore 66 for insertion of the bottom pin 62. In pivotal action of the swivel assembly 38 the longitudinal plate members 46 thereof will provide stop means in both directions against the plate 24 of the movable arm.

It has been discovered that grabbing engagement of a conical object is enhanced by making the inner surface of the swivel plate 38 with a radius which is less than the radius of the inner surface 30 of the static arm 18. As illustrated in FIG. 2 the static arm 18 will seek circumferential line engagement along an outer diameter 68 of the conical object while the swivel assembly 38 will seek circumferential line engagement along a lesser diameter 70 of the conical object combined with perpendicular line engagement along the conical surface of the object. In any event the smaller radius of the swivel plate assembly will enable enhanced line engagement by the swivel assembly with the object regardless of the engagement condition of the static arm 18 with the object.

As illustrated in FIG. 2 the lift cable 16 may be connected to an upstanding plate projection 72 which extends upwardly from the plate 24 of the static arm 18. This connection may be made by any suitable means such as a shackle 74. In order to pivotally rotate the movable arm 20 with respect to the static arm 18 a power means, such as the hydraulic motor 36, may be fixedly connected to the rear side of the static arm plate 24 with the output shaft 34 extending through both plates 22 and 24 of the arms. The top end of the plate 24 of the movable arm may be fixedly connected to the output shaft 34 by a hub 76 which is keyed to the shaft by a key 78 and which is secured to the plate 28 by a series of bolts 80. Hydraulic lines 82 and 84 extend between the submersible 12 and the hydraulic motor 36 for selectively rotating the output shaft 34 in a clockwise or counterclockwise direction. With such an arrangement an operator within the submersible 12 can selectively open and close the arms 18 and 20 of the claw assembly for retrieving sunken objects.

In operation of the present invention the operator of a deep submersible 12 hovers over an object, such as the conical object 14, with the claw assembly 10 in such a position that the arms 18 and 20 will encompass the sunken object. The most desirable location of the claw assembly with respect to the sunken object would be for the static arm 18 to encompass a circumferential line about the cone so that upon closure of the movable arm 20 the swivel assembly 38 will pivot to engage the conical object along a smaller diameter simultaneously with line engagement perpendicular along the conical surface. Regardless of the location of the grab however, the swivel plate will always enhance the grabbing force when irregular sunken objects are to be retrieved.

Obviously many modifications and variations of the present invention are possible in the light of the above teachings. It is therefore to be understood that within the scope of the appended claims the invention may be practiced otherwise than as specifically described.

I claim:

1. A claw assembly for retrieving conical objects comprising:
   a pair of pivoted arms which are rigid and have inner facing curved surfaces;
   a rigid swivel plate pivotally mounted to at least one of the arms, said swivel plate having an inner facing curved surface;
   the pivot axis of the swivel plate being in a plane which is substantially perpendicular to the pivot axis of the arms;
   one of the arms being adapted to be substantially static and the other arm being pivotally movable with respect to the static arm; and
   the swivel plate being mounted to the movable arm.

2. A claw assembly as claimed in claim 1 including:
   the swivel plate being mounted to an outer end portion of the movable arm.

3. A claw assembly as claimed in claim 1 including:
   the movable arm having a recess on its inner side; and said swivel plate being located and pivoted within said recess.

4. A claw assembly as claimed in claim 1 including:
   the curved surface of the swivel plate being substantially co-extensive with the inner surface of the movable arm.

5. A claw assembly as claimed in claim 1 including:
   the inner surfaces of the swivel plate and the static arm being circular with the radius of the circular surface of the swivel plate being less than the radius of the circular surface of the static arm.

6. A claw assembly as claimed in claim 4, including:
   the curved surface of the swivel plate being substantially co-extensive with the inner surface of the movable arm.

7. A claw assembly as claimed in claim 6, including:
   the swivel plate being mounted to an outer end portion of the movable arm.

8. A claw assembly as claimed in claim 7, including:
   the movable arm having a recess on its inner side; and said swivel plate being located and pivoted within said recess.

9. A claw assembly as claimed in claim 8, including:
   said static arm being adapted to be connected to a lift cable; and power means mounted on the static arm for pivotally rotating the movable arm with respect to the static arm.

10. A claw assembly as claimed in claim 9, including:
    elastomeric material attached to the inner surfaces of the arms and the swivel plate so as to provide a non-skid gripping surface.

* * * * *